United States Patent [19]

Kouyama

[11] Patent Number: 4,646,136

[45] Date of Patent: Feb. 24, 1987

[54] TELEVISION SIGNAL SYNCHRONIZING APPARATUS WITH SYNC PHASE CONTROL FOR VIDEO SIGNAL

[75] Inventor: Toshitake Kouyama, Tokyo, Japan

[73] Assignee: NEC Corporation, Japan

[21] Appl. No.: 658,351

[22] Filed: Oct. 5, 1984

[30] Foreign Application Priority Data

Oct. 6, 1983 [JP] Japan ............................... 58-187324

[51] Int. Cl.[4] ........................ H04N 9/44; H04N 9/475
[52] U.S. Cl. ...................................... 358/19
[58] Field of Search ............................ 358/19

[56] References Cited

U.S. PATENT DOCUMENTS

| 4,054,904 | 10/1977 | Saitoh et al. | 358/19 |
| 4,339,770 | 7/1982 | Dennison et al. | 358/19 |
| 4,373,168 | 2/1983 | Mizukami et al. | 358/19 |

Primary Examiner—John W. Shepperd
Attorney, Agent, or Firm—Ostrolenk, Faber, Gerb & Soffen

[57] ABSTRACT

A television synchronizing apparatus for synchronizing an input television signal to a reference television signal. The input and output television signals are of the type which include several signal components including a video signal, a color subcarrier signal and a horizontal sync signal. The input television signal is stored in a memory at locations thereof which are determined by write-in memory addresses which are produced in synchronism with the input television signal. The input television signal is read-out or retrieved from the memory under the control of read out addresses which are produced in synchronism with the reference television signal. A control circuit controls the generation of the read-out addresses so that with reference to the composite television signal which is retrieved from the memory, the absolute value of the phase shift between the video signal and the horizontal sync signal of the composite television signal is not greater than one-half the period of the color subcarrier signal under all circumstances.

4 Claims, 7 Drawing Figures

FIG. 2.

| | VIDEO IN | | OPERATION SEQUENCE OF WRITE-ADDRESS COUNTER | | |
|---|---|---|---|---|---|
| | LINES | SUB-CARRIER | MODIFIED LINES | MODIFIED SUBCARRIERS | SC SEQUENCE |
| COLOR FIELD I | (525/2) 262.5 | (262.5× 455/2) 59,718.75 | (262.5 + 0.5) 263 | (263 × 455/2 + 0.5) 59,833 | (228) 227, 228 ----228 |
| COLOR FIELD II | " | " | (262.5 - 0.5) 262 | (262 × 455/2 + 0) 59,605 | 227, 228, 227 ----228 |
| COLOR FIELD III | " | " | (262.5 + 0.5) 263 | (263 × 455/2 - 0.5) 59,832 | (227) 228, 227 ----227 |
| COLOR FIELD IV | " | " | (262.5 - 0.5) 262 | (262 × 455/2 + 0) 59,605 | 228, 227, 228 ----227 |
| TOTAL | (525×2) 1050 | (1050× 455/2) 238,875 | 1050 | 238,875 | — |

119,438

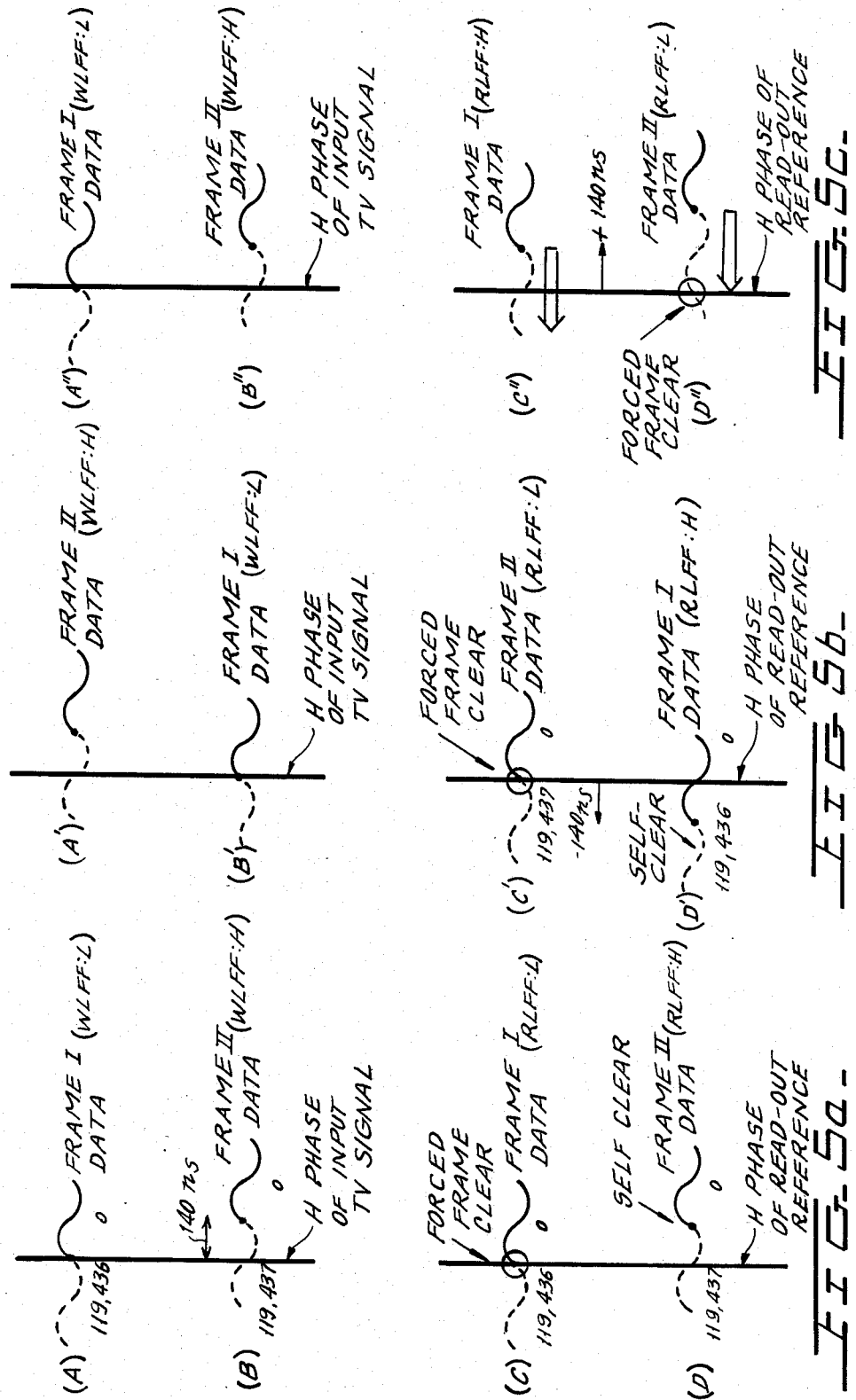

TELEVISION SIGNAL SYNCHRONIZING APPARATUS WITH SYNC PHASE CONTROL FOR VIDEO SIGNAL

BACKGROUND OF THE INVENTION

This invention relates to a television signal synchronizing apparatus.

A television signal synchronizing apparatus synchronizes an input television signal with a read-out reference signal. The input television signal is converted into a digital video signal, and the digital video signal is written into a memory, having a write-in port and a readout port, at address locations produced by a write-in address generator, in synchronism with the input television signal. At the read-out port, the digital video signal is read out in accordance with read-out addresses generated in synchronism with the read-out reference signal. Thereafter, the read out digital video signal is converted back into an analog television signal. Such television signal synchronizing apparatus is disclosed in U.S. Pat. No. 4,007,486, for example.

On the other hand, the following relationships are defined between the color subcarrier frequency $F_{sc}$, the horizontal sync frequency $F_H$, the vertical sync frequency $F_V$, and the frame frequency $F_F$ in the NTSC system:

$$F_{sc} = (455/2) \cdot F_H$$

$$F_H = (525/2) \cdot F_V$$

$$F_F = \tfrac{1}{2} F_V$$

The above equations imply that the phase of the color subcarrier is inverted 180 degrees between a given frame and the next frame. These consecutive two frames are defined as color frames I and II, respectively, hereinafter. In other words, the phase relationship between the color subcarrier and the horizontal sync signal completes one cycle within four fields. These consecutive fields are also defined as color fields I, II, III and IV, respectively, hereinafter.

In a television signal synchronizing apparatus having one frame memory capacity, i.e., a frame synchronizer, the relationship between the phase of the video signal and the phase of the horizontal sync signal in an input television signal is maintained in a read-out television signal (zero offset) when the color frame of the input television signal to be written into the frame memory agrees with that of the read-out reference signal. But when the relationships between the phase of the video signal and the phase of the horizontal sync signal in the input and read-out video signals are different, an undesirable phase shift (offset) of $\pm \tfrac{1}{2}$ the color subcarrier period ($\pm 140$ ns) occurs between the phase of the video signal and the phase of the horizontal sync signal in the input and read out video signals. This happens when, for example, the television signal of the color frame I (color fields I and II) is read out under the control of color frame II (color fields III and IV) or vice versa. Therefore, the phase offset reaches a maximum of one subcarrier period (280 nsp-p) and causes horizontal picture shift on the television screen. In practice, of course, a composite sync signal in accordance with the read-out reference signal is added to the read-out video signal and, thus, a television signal regulated under the standard is delivered. But the offset between the position (phase) of the video signal and the horizontal sync position (phase) is still present.

SUMMARY OF THE INVENTION

It is therefore an object of the present invention to provide a television signal synchronizing apparatus which can reduce, by half, the maximum 280 nsp-p offset to a maximum of 140 nsp-p, with an extremely simple circuit.

According to the present invention, there is provided a television signal synchronizing apparatus comprising: a write-in address generating circuit; a memory for storing a video signal of an input television signal in memory locations generated by the write-in address generating circuit; a readout address generating circuit to read the video signal from the memory; a phase relationship detecting circuit for producing a phase signal indicating a phase relationship between a horizontal sync signal and a color subcarrier both of which are present in a read-out reference signal; and a forced clear pulse producing circuit responsive to the horizontal sync signal and a vertical sync signal contained in the read-out reference signal, and the phase signal, whereby the read-out address circuit is cleared by the forced clear pulse.

BRIEF DESCRIPTION OF THE DRAWINGS

FIG. 2 is a table showing a write-in sequence in the embodiment shown in FIG. 1;

FIGS. 5(a), 5(b) and 5(c) are timing charts for explaining compensation of phase offsets according to the present invention.

DESCRIPTION OF THE PREFERRED EMBODIMENT

Figure 1:
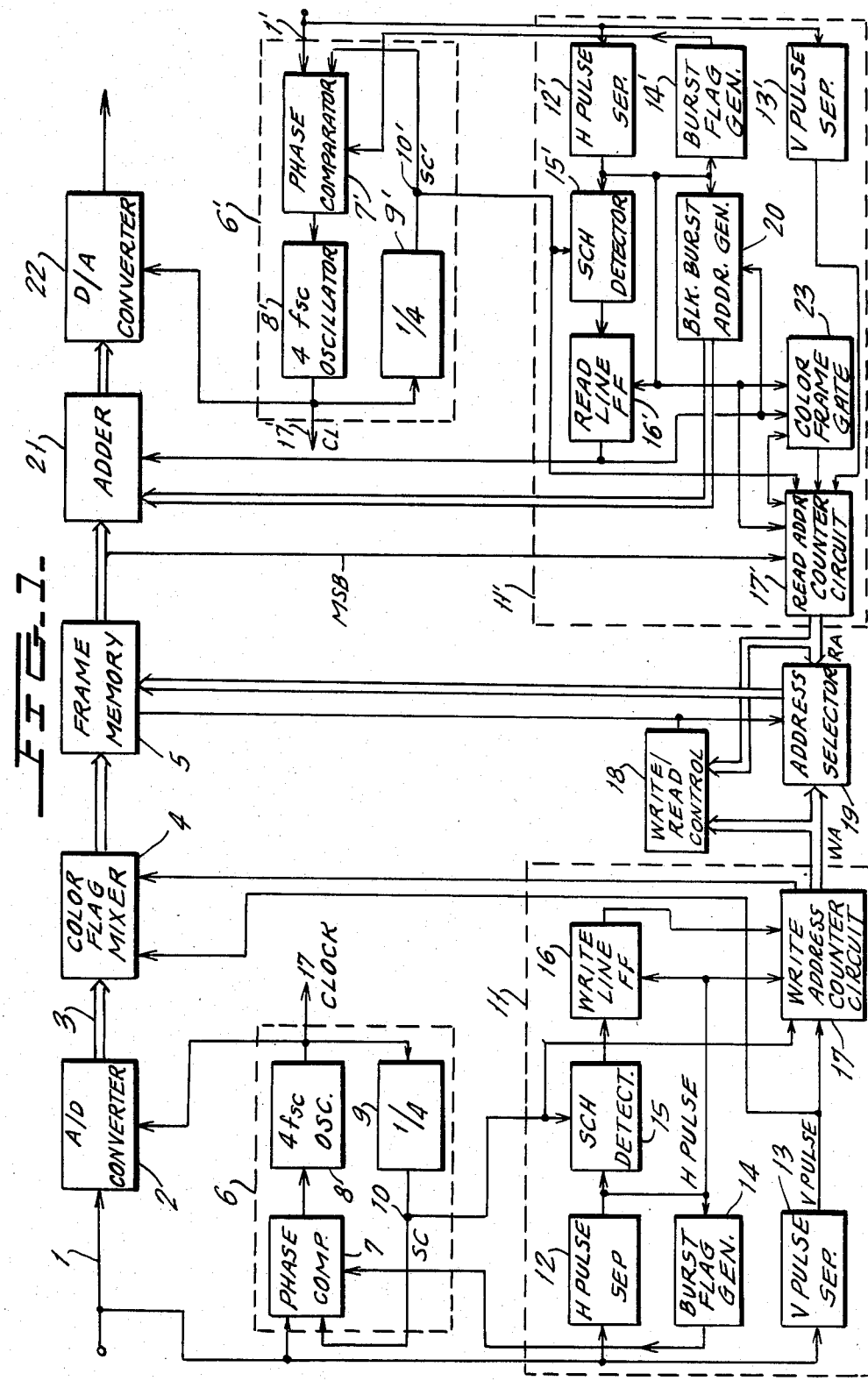
FIG. 1 is a block diagram of an embodiment of the present invention.

Referring first to FIG. 1, which illustrates an embodiment of the present invention, an input television signal 1 is converted to PCM data 3 by an A/D converter 2, and is then sent to a color flag mixer 4 where a signal representative of a color frame is added. The PCM data from the color flag mixer 4 is written into a frame memory 5 under the control of a write-in address WA.

The input television signal 1 is also supplied to a write clock generator 6, which includes a phase comparator 7, an oscillator 8 generating a clock of a frequency four times that of the color subcarrier, and a frequency divider 9 dividing the frequency of the clock by four to produce a subcarrier frequency signal SC 10. The phase comparator 7 compares the phase of a burst signal, which is extracted from the input television signal 1 and represented by a burst flag signal indicating the position of the burst signal, with the phase of the subcarrier frequency signal 10, and sends the comparison result to the oscillator 8 which consists of a voltage-controlled oscillator (VCO).

A write address generator 11 then generates the write-in addresses for writing the PCM data into the frame memory 5. This write address generator 11 includes a horizontal (H) pulse separator 12 which extracts a horizontal sync pulse (H pulse) from the input television signal 1, a vertical (V) pulse separator 13 which extracts a vertical sync pulse (V pulse) therefrom, a burst flag generator 14 which generates the burst flag signal in response to the H pulse, an SCH detector 15 which receives the H pulse and the subcarrier frequency signal 10 and detects the phase relationship between the horizontal sync signal and the subcarrier, a write-in line flip-flop 16 which generates a write-in line flip-flop (WLFF) pulse having alternative low and high levels of the H period, in response to the output of the SCH detector 15 and the H pulse, and a write address counter circuit 17 which generates the write-in addresses WA in response to a field odd/even identification signal (produced in the same block 17), the H pulse, the V pulse, the subcarrier frequency signal 10, and the clock. The write address counter circuit 17 also includes a latch circuit to latch the WLFF pulse by the frame pulse in order to deliver a discriminating signal to discriminate between the color frames I and II. This discriminating signal in inserted into the PCM video data 3, particularly into the most significant bit (MSB) of the data 3, during the vertical blanking period by the color flag mixer 4. With respect to the frame memory 5, a write/read controller 18 for controlling the writing and reading thereof, and a memory address selector 19 for selecting the write-in address WA or the read-out address RA are provided.

The write-in addresses generated by the write address counter 17 circuit are sequenced as shown in FIG. 2.

Figure 3:
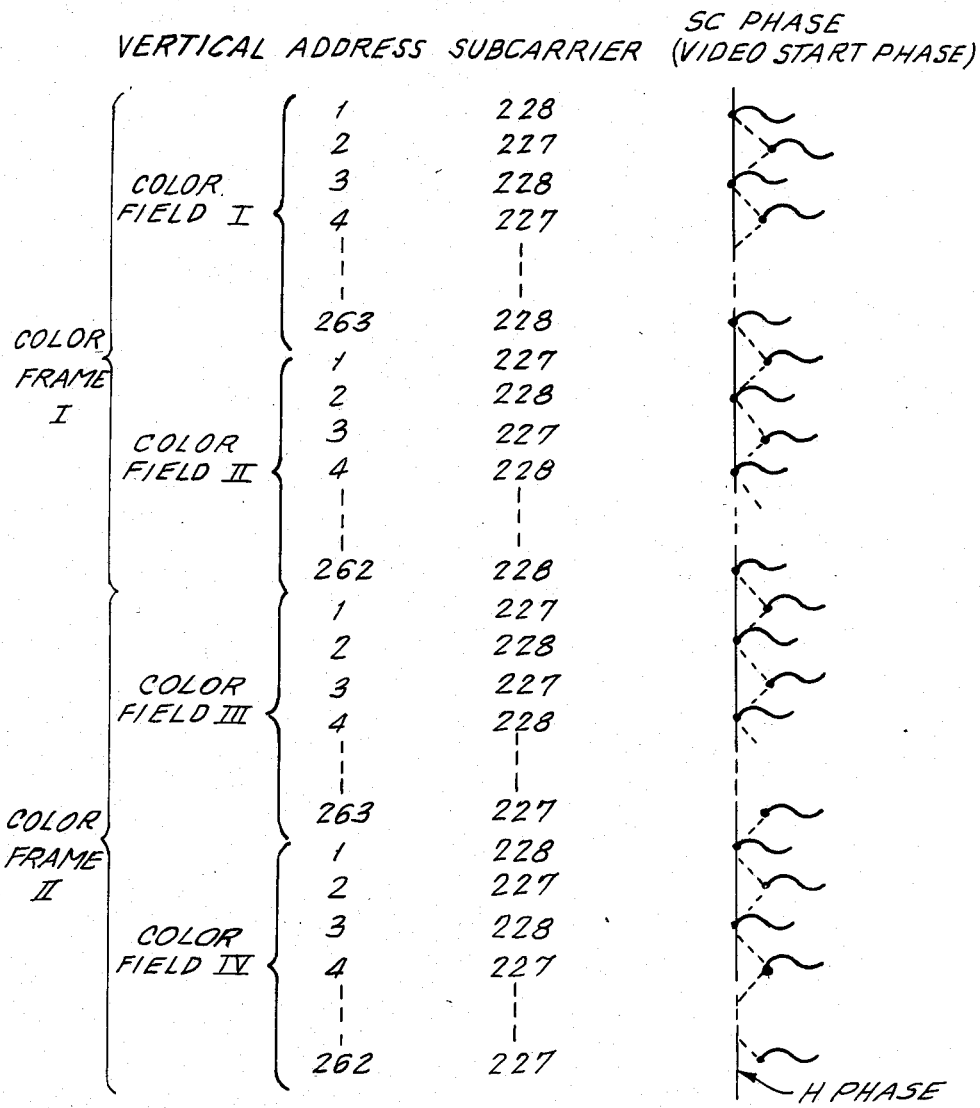
FIG. 3 is a table showing a address sequence, i.e., the number of subcarriers in each line for each color field, and showing the relationship between a horizontal sync signal and a start of a video signal, in a frame synchronizer.

The polarity of the WLFF pulse delivered from the write-in line flip-flop 16 corresponds to the number of subcarriers in one horizontal period. In this embodiment, the number of subcarrier cycles contained in a horizontal line is controlled to be 228 when the WLFF pulse is low, whereas a line corresponding to a high WLFF pulse has 227 subcarrier cycles. A start point of the write-in address in the horizontal direction in relation to the phase of the horizontal pulse, i.e., the phase of a horizontal clear pulse in the write address counter, changes in a zigzag form as shown by the dashed line in FIG. 3. In the Figure, the start point of the write-in address in the horizontal direction is indicated by a start of the color subcarrier waveform. The reason is that, in the frame synchronizer, both the write-in address and the read-out address are controlled within one subcarrier period in order to avoid occurrence of a color hue disorder during a transition period. Therefore, the start point of the address is shown by the color subcarrier waveform in this embodiment.

Next, a read-out operation of the frame synchronizer will be described. A read-out reference signal 1' is applied to a read clock generator 6' to generate a read-out clock and a subcarrier frequency signal SC 10'. The construction and operation of this generator are the same as in the write clock generator 6. In a read address generator 11', an H pulse separator 12', a V pulse separator 13', a burst flag generator 14', an SCH detector 15', and a read-out line flip-flop 16' outputting a read-out line flip-flop (RLFF) pulse are the same as those of the write-in generator 11. A read address counter circuit 17' generates the read-out address RA. A blanking burst address generator 20 outputs a composite sync signal including sync and blanking signals on the basis of the read-out reference signal 1', which is added by an addition circuit 21 to a video signal read out from the frame memory 5. The output of the addition circuit 21 is converted into an analog television signal by a D/A converter 22.

Figure 4:
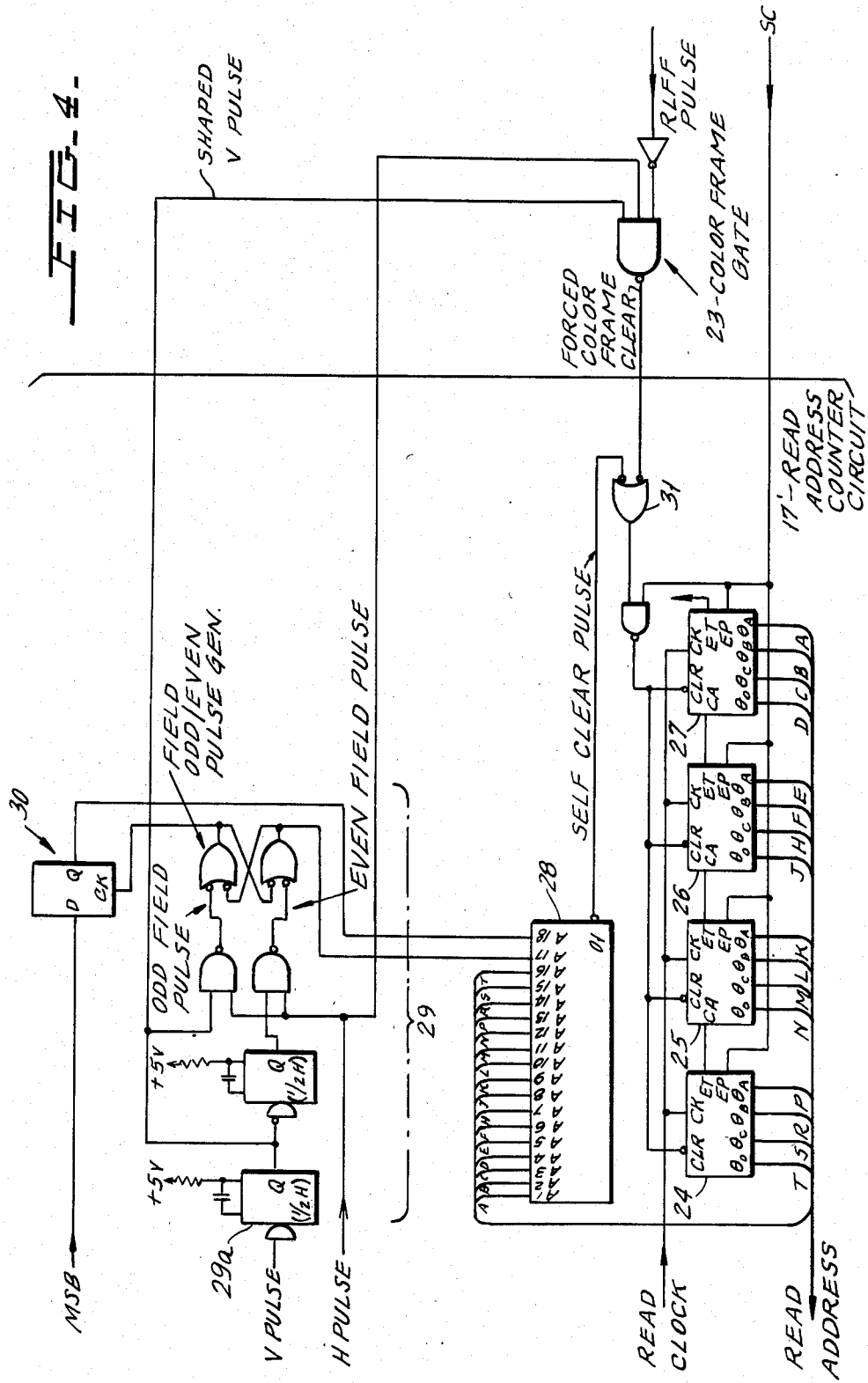
FIG. 4 is a detailed schematic of a read-out address counter circuit and a color frame gate in the embodiment shown in FIG. 1.

Referring to FIG. 4, the read-out address counter circuit 17' and a color frame gate 23 in the read address generator 11' will be described hereinafter. The read-out address (A-T) is delivered from a series of four counters. The two counters 24 and 25 produce the horizontal read address (K-T), and the two counters 26 and 27 produce the vertical read address (A-J). A decoder 28 receives the read address (A-T), and odd/even field discriminating signal and a color frame discriminating signal, and delivers a self clear pulse at the end of frame period.

A field pulse generator 29 receives the H pulse and the V pulse and delivers the odd/even field discriminating signal. A flip-flop 30 latches the frame discriminating signal, which is inserted in the MSB of the data 3, read out from the frame memory 5 at the occurrence of the vertical blanking timing mark, and delivers the color frame discriminating signal. The self clear pulse delivered from the decoder 28 is transmitted through an OR gate 31 to the series of the four counters 24, 25, 26 and 27 to clear these counters. The color frame gate 23 receives the H pulse, the read-out line flip-flop (RLFF) pulse delivered from the read-out line flip-flop 16' (FIG. 1), and a shaped V pulse. The shaped V pulse, which is regulated in pulse width, is delivered from a multivibrator 29a in the field pulse generator 29.

In the color frame gate 23, the combination of the H and V pulses produces one timing mark during one frame period. Furthermore, the starting polarity of the RLFF (WLFF) pulse varies in accordance with the color frame. As shown in the table of FIG. 2, the start polarity of WLFF (RLFF) pulse is the low level in the color frame I, and in the high level in the color frame II. Therefore, one timing mark is delivered from the color frame gate 23 during two frame periods as a forced clear pulse. In this embodiment, the timing of the forced clear pulse from the color frame gate 23 is set at the start of color frame I. The forced clear pulse is supplied to the OR gate 31 to clear the read address counters 24, 25, 26 and 27.

The offset compensation according to the present invention will be explained hereinafter with reference to FIGS. 5(a), 5(b) and 5(c). First, FIG. 5(a) shows a first case where input video signals corresponding to the color frames I and II are serially written into a memory and, then, serially read out in accordance with read-out sequences of the color frames I and II, respectively. In the first case, the relationships of the color frames I and II between the subcarrier phase and the H pulse phase in the write-in side are shown as (A) and (B), and those of the color frames I and II in the read-out side are shown as (C) and (D). In this case, the relationship are the same in the write-in and read-out sides and, therefore, the offset is zero. In FIG. 5(a), the timing of the forced clear pulse delivered from the color frame gate 23 (FIG. 4) is indicated by a hollow circle.

FIG. 5(b) shows a second case where input video signals corresponding to the color frames II and I are serially written and, then, serially read-out in accordance with read-out sequences of the color frames I and II, respectively. In the second case, the relationship between the subcarrier phase and the H pulse phase in the read-out side shown as (C') and (D') is different from that shown as (A') and (B') in the write-in side, and advances by 140 ns. In this case, the forced clear pulse timing is matched with the H pulse timing as in the first case, and is also indicated by a hollow circle in FIG. 5(b).

FIG. 5(c) shows a third case where input video signals corresponding to the color frames I and II are serially written and, then, serially read out in accordance with read-out sequences of the color frames II and I, respectively. In the third case, the relationships between the subcarrier phase and the H pulse phase in the read-out side shown as (C") and (D") are different from those shown as (A") and (B"), and are delayed by 140 ns without the compensation according to the present invention, i.e., the forced clear pulse. In this case, since the forced clear pulse is generated at the timing of the H pulse of the read-out reference signal as a hollow circle, the start phase of the subcarrier (i.e., the start of the video signal) is shifted forward by 280 ns. Consequently, the third case becomes the same as the second case. In other words, the delay of 140 ns is shifted to the advance of 140 ns. In the manner as described above, the maximum phase offset between the horizontal sync signal and the video signal of 280 nsp-p can be halved to 140 nsp-p.

Therefore, according to the present invention, the horizontal picture shift can be reduced with a simple circuit configuration.

What is claimed is:

1. A television signal synchronizing apparatus comprising:
    means for generating write-in addresses in synchronism with an input television signal;
    means for storing a video signal of said input television signal at memory locations determined by said write-in addresses;
    means for generating read-out addresses in synchronism with a read-out reference signal, said read-out addresses controlling the reading out of said video signal from said storing means;
    means for producing a phase signal indicating a phase relationship between a horizontal sync signal of said reference signal and a color subcarrier of said reference signal;
    means for producing a forced clear pulse in accordance with said horizontal sync signal and a vertical sync signal of said read-out reference signal, and said phase signal; and
    means for clearing said read-out address generating means in response to said forced clear pulse.

2. A television signal synchronizing apparatus as in claim 1, wherein said storing means includes a plurality of memory locations sufficient for storing therein a portion of said video signal which corresponds to one television frame, and wherein said forced clear pulse is produced once during two television frames.

3. A television signal synchronizing apparatus comprising:
    means for generating write-in addresses in synchronism with an input television signal;
    means for producing a color frame identification signal in response to the determination of the phase relationship between a subcarrier of said input television signal and a horizontal sync signal of said input television signal;
    means for mixing said color frame identification signal into said video signal to be stored in said storing means;
    means for storing a video signal of said input television signal and said color identification signal associated with said video signal at memory locations of said storing means determined by said write-in addresses; and
    means for generating read-out addresses in synchronism with a read-out reference signal for reading out said video signal from said storing means, said read-out addresses generating means including means for producing a phase signal indicating a phase relationship between a horizontal sync signal of said reference signal and a color subcarrier of said read-out reference signal, means for separating said color frame identification signal from said video signal read out from said storing means, a counter circuit, responsive to a clock, for generating said read-out addresses, decoder means for producing a self clear pulse indicating the end of a television frame in response to said read-out addresses and said color frame identification signal delivered from said separating means, means fior producing a forced clear pulse in response to said horizontal sync signal and a vertical sync signal of said read-out reference signal, and said phase signal, and means for clearing said counter circuit in response to said self clear pulse or said forced clear pulse.

4. A television signal synchronizing apparatus for synchronizing an input television signal which includes at least a video signal, a color subcarrier signal and a horizontal sync signal, to a reference television signal which includes at least a vertical sync signal, a horizontal sync signal and a burst signal, said apparatus comprising:
    means for producing write-in addresses in synchronism with said input television signal;
    memory means for storing therein, in memory locations thereof determined by said write-in addresses, at least a portion of said input television signal which corresponds to one television frame;
    means for marking the data in said memory to indicate the phase of the data's subcarrier with respect to the data's horizontal sync;
    means for producing read-out addresses in synchronism with said reference television signal and in response to said marked data in said memory;
    means for applying said read-out addresses to said memory means to retrieve said input television signal; and
    means responsive to the vertical sync signal, the horizontal sync signal, and the burst signal included in said reference television signal for clearing said read-out address producing means, so as to control said read-out address producing means, to produce said read-out addresses to have values which ensure that the absolute value of the maximum phase shift between said video signal and said horizontal sync signal of said input television signal, after said input television signal is read out from said memory means, is not greater than one-half the period of said color subcarrier signal.

* * * * *